United States Patent
Regnard et al.

(10) Patent No.: US 11,988,168 B2
(45) Date of Patent: May 21, 2024

(54) RESONATING PATCH AND ACOUSTIC TREATMENT CELL PROVIDED WITH SUCH A PATCH

(71) Applicants: SAFRAN AIRCRAFT ENGINES, Paris (FR); CENTRE NATIONAL DE LA RECHERCHE SCIENTIFIQUE, Paris (FR); UNIVERSITE DU MANS, Le Mans (FR)

(72) Inventors: Josselin David Florian Regnard, Moissy-Cramayel (FR); Thibault Abily, Moissy-Cramayel (FR); Stéphane Bernard Durand, Pruille-le-Chetif (FR)

(73) Assignees: SAFRAN AIRCRAFT ENGINES, Paris (FR); CENTRE NATIONAL DE LA RECHERCHE SCIENTIFIQUE, Paris (FR); UNIVERSITE DU MANS, Le Mans (FR)

( * ) Notice: Subject to any disclaimer, the term of this patent is extended or adjusted under 35 U.S.C. 154(b) by 180 days.

(21) Appl. No.: 17/756,500

(22) PCT Filed: Nov. 19, 2020

(86) PCT No.: PCT/FR2020/052141
§ 371 (c)(1),
(2) Date: May 26, 2022

(87) PCT Pub. No.: WO2021/105595
PCT Pub. Date: Jun. 3, 2021

(65) Prior Publication Data
US 2022/0412289 A1    Dec. 29, 2022

(30) Foreign Application Priority Data
Nov. 29, 2019  (FR) ........................................ 1913517

(51) Int. Cl.
*F02K 1/82* (2006.01)
*G10K 11/16* (2006.01)
*G10K 11/172* (2006.01)

(52) U.S. Cl.
CPC ............ *F02K 1/827* (2013.01); *G10K 11/161* (2013.01); *G10K 11/172* (2013.01)

(58) Field of Classification Search
CPC . F02K 1/827; F02C 7/045; F02C 7/24; B64D 2033/0206; G10K 11/161; G10K 11/172
See application file for complete search history.

(56) References Cited

U.S. PATENT DOCUMENTS

| | | | | | |
|---|---|---|---|---|---|
| 5,415,522 | A | * | 5/1995 | Pla .................... | G10K 11/17854 381/71.7 |
| 5,423,658 | A | * | 6/1995 | Pla .................... | G10K 11/17854 381/71.7 |

(Continued)

FOREIGN PATENT DOCUMENTS

WO    WO-2019171000 A1 *  9/2019  ............. B64D 33/02

OTHER PUBLICATIONS

French Search Report issued in French Application FR 1913517 dated Aug. 14, 2020 (3 pages).

(Continued)

*Primary Examiner* — Jeremy A Luks
(74) *Attorney, Agent, or Firm* — Bookoff McAndrews, PLLC

(57) ABSTRACT

Resonating patch for acoustic treatment comprising a resonant plate, a transducer and an electrical circuit electrically connected to the transducer, the resonant plate comprising a peripheral strip extending along the perimeter of the resonant plate.

(Continued)

The patch comprises cutouts together defining deformable lamellae having at least one end connected to the peripheral strip.

17 Claims, 6 Drawing Sheets

(56) References Cited

U.S. PATENT DOCUMENTS

| | | | | |
|---|---|---|---|---|
| 5,478,199 | A * | 12/1995 | Gliebe | B64D 33/02 244/1 N |
| 5,498,127 | A * | 3/1996 | Kraft | F02C 7/045 60/725 |
| 5,702,230 | A * | 12/1997 | Kraft | F02K 1/827 381/71.7 |
| 5,778,081 | A * | 7/1998 | Patrick | G10K 11/161 381/71.7 |
| 5,979,593 | A * | 11/1999 | Rice | F01D 5/16 381/71.7 |
| 6,041,125 | A * | 3/2000 | Nishimura | G10K 11/172 381/71.4 |
| 6,274,216 | B1 | 8/2001 | Gonidec et al. | |
| 7,074,287 | B2 * | 7/2006 | Belleguic | G10K 11/172 156/182 |
| 10,408,129 | B1 * | 9/2019 | Goto | G10K 11/17873 |
| 2002/0061110 | A1 * | 5/2002 | Kobayashi | G10K 11/17861 381/71.7 |
| 2004/0045766 | A1 | 3/2004 | Porte et al. | |
| 2005/0013457 | A1 * | 1/2005 | Sheplak | G10K 11/172 381/338 |
| 2006/0219477 | A1 | 10/2006 | Ayle | |
| 2013/0341119 | A1 | 12/2013 | Ichihashi | |
| 2015/0041248 | A1 | 2/2015 | Ichihashi | |
| 2019/0287510 | A1 * | 9/2019 | Goto | G10K 11/161 |

OTHER PUBLICATIONS

International Search Report and Written Opinion of the International Searching Authority issued in International Application PCT/FR2020/052141 dated Mar. 1, 2021 (13 pages).

* cited by examiner

[Fig. 1]
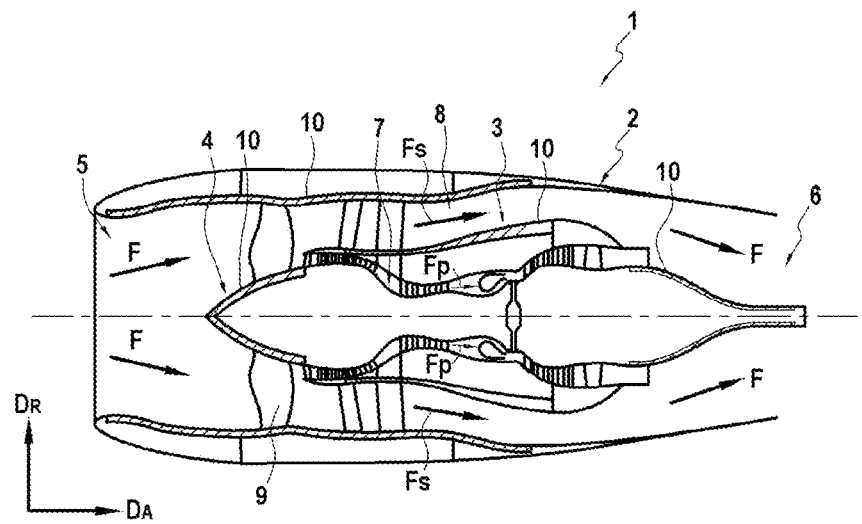
[Fig. 2]
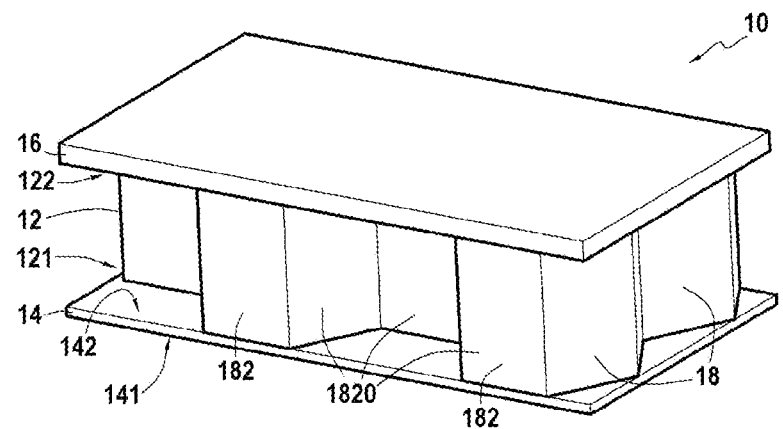

[Fig. 3]
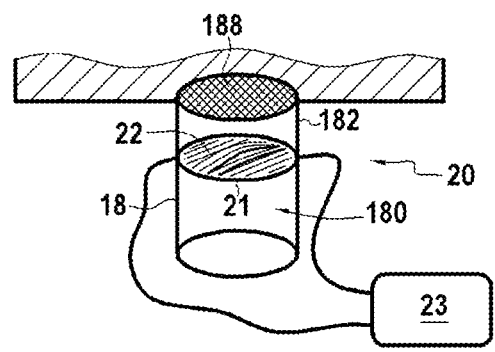
[Fig. 4]
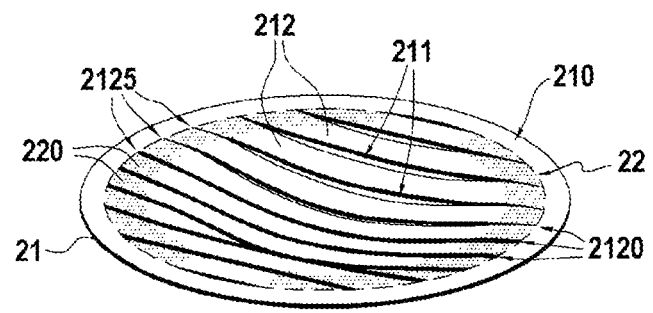

[Fig. 5]
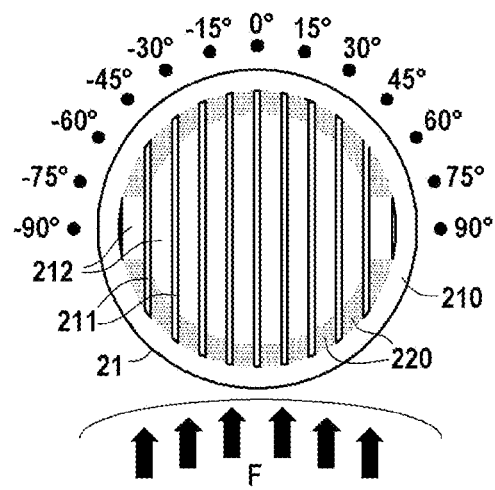
[Fig. 6]
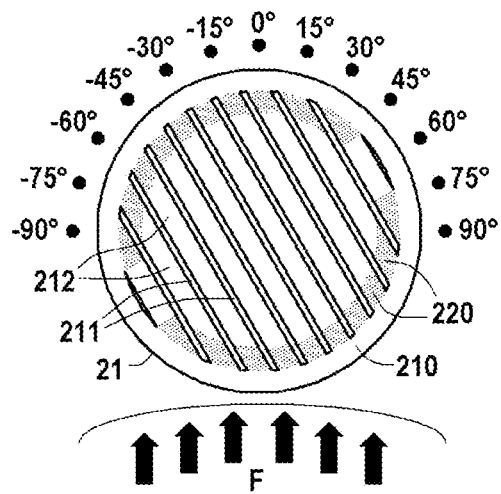

[Fig. 7]
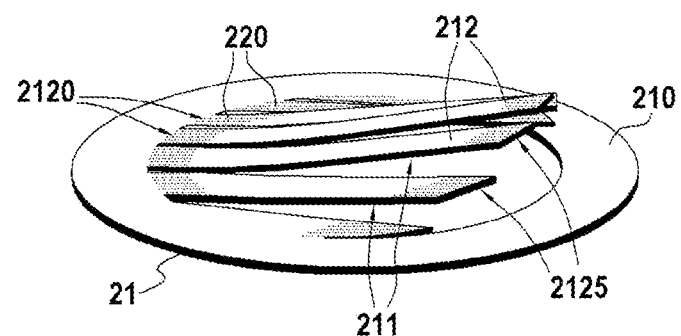
[Fig. 8]
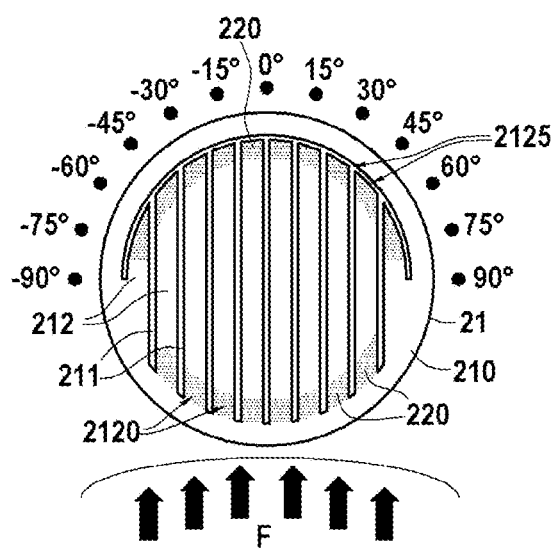

[Fig. 9]
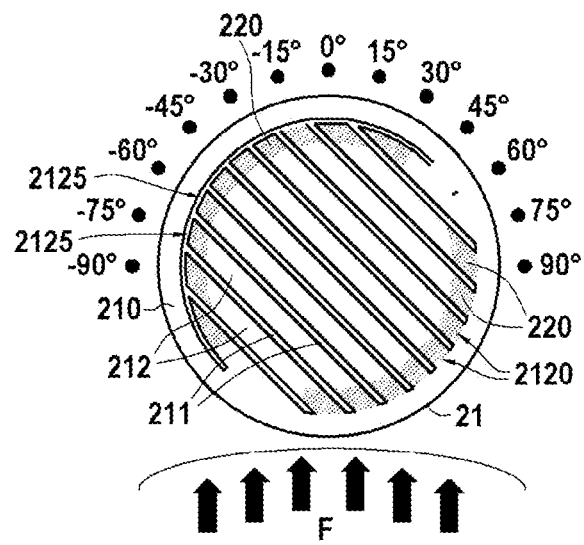
[Fig. 10]
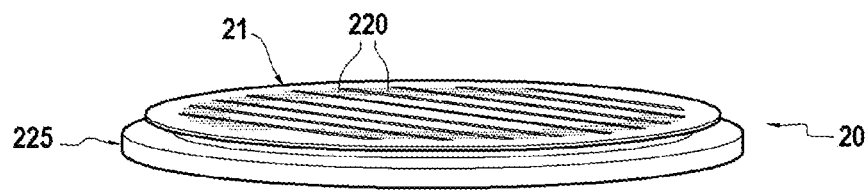
[Fig. 11]
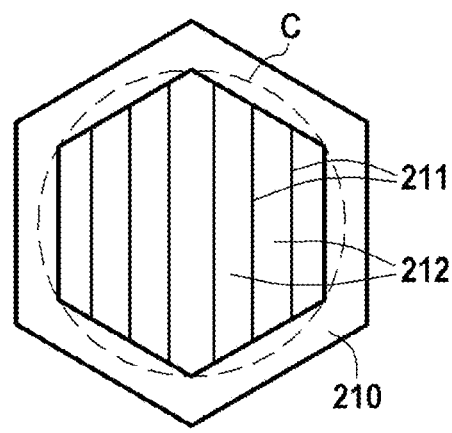

[Fig. 12]
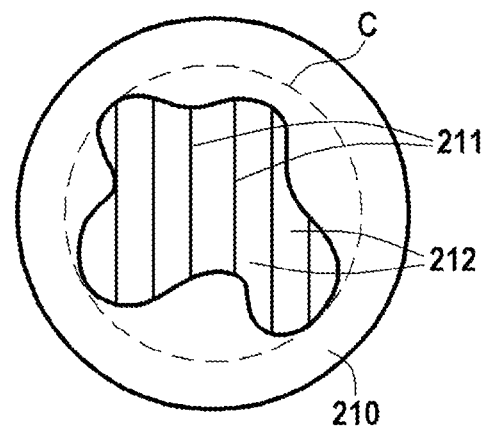
[Fig. 13]
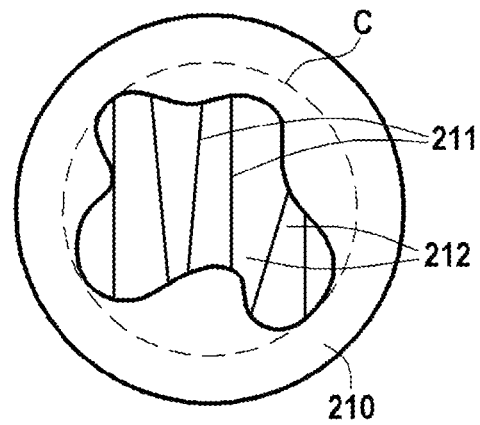

RESONATING PATCH AND ACOUSTIC TREATMENT CELL PROVIDED WITH SUCH A PATCH

CROSS-REFERENCE TO RELATED APPLICATIONS

This application is a National Stage Application of International Application PCT/FR2020/052141, filed on Nov. 19, 2020, now published as WO 2021/105595 A1, and which claims priority to French Patent Application No. 1913517, filed on Nov. 29, 2019.

TECHNICAL FIELD

The invention relates to the field of the damping of soundwaves emitted by a turbomachine of an aircraft, and more particularly the treatment of soundwaves in the region of the thrust inverters of the turbomachine.

PRIOR ART

When a turbomachine is operating, the interaction between the flow and the solid parts of the turbomachine are responsible for generating noise spreading on either side of the turbomachine.

One of the means of attenuating this acoustic radiation is to integrate means for acoustic treatment in the region of the surfaces in contact with soundwaves.

In conventional terms, acoustic treatment of a turbojet, and more precisely of noise radiated by interaction between the rotor and its environment, is carried out by means of absorbent panels arranged in the region of the wet surfaces of the conduit in which the soundwaves spread. Wet surfaces mean those surfaces in contact with a fluid flow. These panels are generally composite materials of sandwich type enclosing a honeycomb forming acoustic absorption cells, whereof the absorbing properties are obtained in part via the principle of Helmholtz resonators.

The prior art discloses for example acoustic panels having a single degree of liberty, or SDOF for "Single degree of freedom", which present a classic honeycomb structure of panels for acoustic treatment lining the walls of the nacelle of a turbomachine.

The acoustic treatments based on resonators such as Helmholtz resonators, ¼ wave resonators, or again Quincke tubes are connected relative to the characteristic dimensions which fix their frequential attenuation ranges. The tuning frequencies corresponding to the attenuation of this kind of resonator are linked to the wavelength and are therefore inversely proportional to the characteristic dimensions. In other terms, large dimensions of the resonator are needed to attenuate at lower frequencies.

By way of the operating principle of technologies of panel for acoustic treatment using resonating cavities, the radial bulk, that is, the radial thickness, of the panels for acoustic treatment depends on the targeted frequency of treatment to obtain maximum efficiency in terms of acoustic attenuation.

Yet, engine architectures tend towards an increase in the rate of dilution at a slower fan rotation speed. In other words, architectures are showing more and more slower rotation speeds of vaned wheels and a smaller number of vanes on the vaned wheels, which causes a drop in dominant frequencies of noise associated with the module comprising the fan and the rectifier stage, or "fan-OGV" module for "Outlet Guide Vane". This increase in the rate of the flow rate ratio passing through the secondary vein relative to the primary vein, also called "bypass ratio", imposes enlarging of the diameter of fans and consequently an increase in the dimensions of the nacelle. These large dimensions have a negative impact on the drag of the turbojet and therefore on specific consumption. To guarantee gains, the aerodynamic imprint of the nacelles have to be minimised by reduction of their thicknesses and lengths.

Because of this, the matching between the optimal thickness of the acoustic panels and the available bulk in the nacelles is currently not satisfied.

In fact, the fan noise shifts down the range and the surfaces and thicknesses available for integration of panels for acoustic treatment on the engine part and on the nacelle of the turbomachine (main reduction lever of noise) reduce successively.

In light of these constraints, conventional acoustic treatments, consisting of "honeycomb" structures are no longer effective enough at low frequencies to preserve established integration criteria, especially the thickness needed for tuning of the low-frequency resonator in particular.

There is therefore a need to develop more compact novel solutions of acoustic treatments, minimally invasive and more effective at low frequencies.

SUMMARY OF THE INVENTION

The invention aims to propose a solution for acoustic treatment optimised for attenuations at low frequencies and whereof the range of attenuation is wider in a reduced bulk so it can be integrated in propulsive architectures at high dilution rates.

In one aim of the invention, a resonating patch is proposed for acoustic treatment for a cell for acoustic treatment of an acoustic panel of a turbomachine of an aircraft, the resonating patch comprising a resonant plate, a transducer and an electrical circuit electrically connected to the transducer, the resonant plate comprising a peripheral strip extending along the perimeter of the plate.

According to a general characteristic of the invention, the resonant plate comprises cutouts together defining deformable lamellae having at least one end connected to the peripheral strip.

The lamellae formed by the cutouts on the resonating patch according to the invention offer vibroacoustic coupling with the pressure waves for optimising low-frequency attenuation in restricted bulk.

The cutouts form slots which at the same time, via their fine thickness, generate considerable energy losses in the form of heat due to visco-thermal properties, and add inertia to the fluid passing through the plate and therefore shift the tuning frequency of the resonating patch to still lower frequencies.

Integration of electromagnetic coupling due to use of transduction generates electrical energy at the terminals of this material. The captured energy can then be reused to steer the tuning frequency/frequencies of the system, or dissipated in heat so as to accentuate the effect of absorption of the system, or recovered for another use.

The combination of the mechanical resonating system formed by the lamellae of the resonant plate with the electric resonating passive or semi-passive and/or dissipative system formed by the transducer has, when this patch is integrated into a cell for acoustic treatment of panel for acoustic treatment, better results for acoustic treatment at low frequencies and limits the bulk of cells for acoustic treatment and therefore of panels for acoustic treatment.

Also, the resonating patch according to the invention is appropriate for use with a flow with a strong grip on the flow fluid, because of the lamellae and the transducer.

According to a first aspect of the resonating patch, the cutouts can be rectilinear cutouts together defining polygonal lamellae.

The rectilinear cutouts are easier to make and form polygonal lamellae having better resistance to wear.

According to a second aspect of the resonating patch, the resonating patch can comprise at least two lamellae of different dimensions which widens the frequential range for acoustic treatment.

According to a third aspect of the resonating patch, the resonant plate can have a form entered in a circle whereof the diameter is between 5 and 50 mm, and the lamellae can have a length of between 1 and 50 mm.

The circular form of the resonating patch allows simplified integration into acoustic necks or conduits.

In honeycomb structures, the resonating patches of hexagonal form will be preferred.

According to a fourth aspect of the resonating patch, lamellae can comprise a width of between 0.5 and 20 mm.

The number of lamellae within the resonant plate is linked directly to their width. The lamellae can have a reduced width for increasing the number of lamellae and therefore improve the bandwidth of the treatment.

According to a fifth aspect of the resonating patch, the lamellae can have a thickness of between 20 µm and 2 mm.

According to a sixth aspect of the resonating patch, the cutouts, that is, the spaces, or even the slots, between the lamellae can have a width of between 10 µm and 1 mm.

The width of the slots corresponding to the cutout in lamellae is an important criterion for acoustic dissipation due to visco-thermal mechanisms which are created between all lamellae when they vibrate.

According to a seventh aspect of the resonating patch, the cutouts can be parallel to each other.

In the case of a circular resonating patch, the parallel cutouts easily form lamellae of different dimensions and therefore increase the frequency range for acoustic treatment.

In a variant, two adjacent cutouts can be devoid of parallelism.

Non-parallel cutouts produce lamellae of non-constant width and have a second action lever on the resonance frequencies of lamellae and therefore of the possible attenuation frequency range.

According to an eighth aspect of the resonating patch, the lamellae can comprise two ends according to the direction of the length, the two ends being attached to the peripheral strip.

A lamella fixed on two sides has the advantage of being more robust due to its lesser articulation/deformation.

According to a ninth aspect of the resonating patch, the plate can comprise a material with a high Young's module for limiting the risk of rupture and limiting the volume mass and therefore retain a certain flexibility. Similar properties show up for example on materials such silicon which has a Young's module of 100 GPa or titanium which has a Young's module of 114 GPa, the Young's module being the longitudinal elasticity module or traction module of material having the constant connecting the traction or compression constraint and the onset of deformation of an isotropic elastic material.

According to a tenth aspect of the resonating patch, the transducer can be an electrodynamic transducer comprising a thin layer of electrically conductive material on the lamellae and a magnet.

The electrodynamic transducer is very simple to implement with a deposit of copper on the mobile part of the concept and the addition of a magnetic magnet in behind. It also has good robustness and good versatility.

In this embodiment, the magnet can be integrated annularly and a copper coil can be deposited at the sites having the maximum articulation.

According to an eleventh aspect of the resonating patch, the transducer can be a piezoelectric transducer comprising a thin layer on the zones of maximal deformations of lamellae, such as at the ends of the lamellae attached to the peripheral strip, to maximise the effect according to phases.

Once a certain temperature is exceeded (which depends on the magnetic material) the magnet of the electrodynamic transducer is demagnetised permanently, destroying transduction in the process. As for the electrodynamic transducer there is a Curie temperature at which the piezoelectric transducer loses its properties. But in contrast to the magnet, the piezoelectric regains this by lowering the temperature.

In another aim of the invention, a cell for acoustic treatment is proposed comprising an enclosure, a cavity delimited by the enclosure, and a resonating patch such as defined hereinabove and arranged in the cavity.

According to a first aspect of the treatment cell, the cell can also comprise a protective grille mounted on an end of the enclosure intended to be opposite a fluidic flow.

The protective grille comprises a perforated, micro-perforated structure or a protective latticed fabric, or protective wiremesh, to reduce the direct impact of the flow.

In one aim of the invention, a panel for acoustic treatment is proposed intended to be arranged on at least one wall of a turbojet in contact with a fluidic flow, the panel comprising a first plate, a second plate parallel to the first plate and having a first face intended to be in contact with a fluidic flow and a second face opposite the first plate.

According to a general characteristic of the invention, the panel for acoustic treatment can also comprise cells for acoustic treatment such as defined above extending between the first and second plates.

In another aim of the invention a turbojet is proposed comprising a nacelle fitted with at least one wall comprising at least one panel for acoustic treatment such as defined hereinabove.

The panel for acoustic treatment offers the possibility of incorporating damping technology on a fixed part of the turbojet, such as a nacelle or a casing, which is less restricted for controlling vibrations of the revolving part.

The turbojet comprises a nacelle, a coaxial intermediate casing and internal casing and defining an axial direction and a radial direction.

The lamellae of resonant plates of cells for acoustic treatment include an orientation defined by an angle between −45° and 45° relative to the axial direction of the turbomachine.

BRIEF DESCRIPTION OF THE DRAWINGS

FIG. 1 illustrates a sectional view of a turbojet according to an embodiment of the invention, in a longitudinal plane of the turbojet.

FIG. 2 illustrates a partial perspective view of a panel for acoustic treatment according to an embodiment of the invention.

FIG. 3 illustrates a schematic perspective view of a cell for acoustic treatment 18 of the core 12 of the panel for acoustic treatment 10 of FIG. 2.

FIG. 4 illustrates a perspective view of the resonant plate 21 of the resonating patch 20 of the cell 18 of FIG. 3 according to a first embodiment.

FIG. 5 illustrates a plan view of the resonant plate 21 of FIG. 4 according to a first orientation relative to a fluidic flow.

FIG. 6 illustrates a plan view of the resonant plate 21 of FIG. 4 according to a second orientation relative to a fluidic flow.

FIG. 7 illustrates a perspective view of the resonant plate 21 of the resonating patch 20 of the cell 18 of FIG. 3 according to a second embodiment.

FIG. 8 illustrates a plan view of the resonant plate 21 of FIG. 7 according to a first orientation relative to a fluidic flow.

FIG. 9 illustrates a plan view of the resonant plate 21 of FIG. 7 according to a second orientation relative to a fluidic flow.

FIG. 10 illustrates a perspective view of a resonating patch 20 with an electrodynamic transducer 22 according to an embodiment.

FIG. 11 illustrates a plan view of the resonant plate 21 of the resonating patch 20 according to a third embodiment.

FIG. 12 illustrates a plan view of the resonant plate 21 of the resonating patch 20 according to a fourth embodiment.

FIG. 13 illustrates a plan view of the resonant plate 21 of the resonating patch 20 according to a fifth embodiment.

DESCRIPTION OF EMBODIMENTS

FIG. 1 shows a sectional view of a turbojet 1 according to an embodiment of the invention, in a longitudinal plane of the turbojet 1.

The turbojet 1 comprises a nacelle 2, an intermediate casing 3 and an internal casing 4. The nacelle 2 and the two casings 3 and 4 are coaxial and define an axial direction $D_A$ and a radial direction $D_R$. The nacelle 2 defines at a first end an inlet channel 5 of a fluid flow and at a second end, opposite the first end, a discharge channel 6 of a fluid flow. The intermediate casing 3 and the internal casing 4 together delimit a primary vein 7 of a fluid flow. The nacelle 2 and the intermediate casing 3 together delimit a secondary vein 8 of a fluid flow. The primary vein 7 and the secondary vein 8 are arranged according to an axial direction $D_A$ of the turbojet 1 between the inlet channel 5 and the discharge channel 6.

The turbojet 1 also comprises a fan 9 configured to deliver an airflow F as fluidic flow, the airflow F being divided when exiting from the fan into a primary flow Fp circulating in the primary vein 7 and into a secondary flow Fs circulating in the secondary vein 8.

The turbojet 1 also comprises panels for acoustic treatment 10 configured to attenuate the acoustic waves emitted by the turbojet 1 before these waves discharge radially to the outside of the nacelle 2 of the turbojet 1.

Each panel for acoustic treatment 10 is configured to attenuate acoustic waves whereof the frequency belongs to a predetermined range of frequencies. In the embodiment illustrated in FIG. 1, the panels 10 for acoustic treatment are integrated into the nacelle 2, the intermediate casing 3 and the internal casing 4. On the internal casing 4, the panels 10 for acoustic treatment are integrated, on the one hand, on the portion upstream of the intermediate casing 3 according to the axial direction $D_A$ and especially on the portion carrying the fan 9, and on the other hand, on a portion downstream of the intermediate casing 3.

FIG. 2 shows a partial view in perspective of a panel for acoustic treatment 10 according to an embodiment of the invention.

In reference to FIG. 2, the panel for acoustic treatment 10 comprises a core 12, an entry layer 14 and a reflecting layer 16.

In the embodiment illustrated in FIG. 2, the core 12 presents a honeycomb structure. More precisely, the core 12 comprises a plurality of alveolae 18, arranged according to a known honeycomb structure. Each alveola 18 forms a cell for acoustic treatment for absorption of soundwaves having a cylindrical form with hexagonal base. Each cell for acoustic treatment 18 comprises a resonating cavity 180 of cylindrical form with hexagonal base and an enclosure 182 comprising 6 walls 1820 extending between the entry layer 14 and the reflecting layer 16.

In variants, the alveolar structure of the core 12 could be formed by acoustic cylindrical cells with circular bases, or other, or even any.

Each alveola 18 terminates on a first face 121 of the core 12 and on a second face 122 of the core 18 located opposite the first face 121. The first face 121 of the core 12 is in contact with the entry layer 14 and is intended to be oriented towards the primary air vein 7 or secondary air vein 8 according to the placement of the panel for acoustic treatment 10. The second face 122 of the core 12 is in contact with the reflecting layer 16 and is intended to be oriented opposite the air vein.

According to the embodiment, the core 12 can be made of metal, or of composite material such as composite material formed from fibres of carbon or glass embedded in a matrix of hardened resin.

The entry layer 14 can be a monobloc plate formed by additive manufacturing. The entry layer 14 has a first face 141 in contact with a fluidic flow such as the flow F and a second face 142 opposite the first face 141 and opposite the core 12 and the reflecting layer 16. At least some of the entry layer 14 is porous.

The reflecting layer 16 is adapted to reflect acoustic waves having a frequency belonging to the predetermined range of frequencies. It is connected to the walls 1820 of the enclosure 182 of the alveolae 18 of the core 12 in the region of its second face 122. It can be fixed to the core 12 by adhesion for example. According to the embodiment, the reflecting layer 16 can be made of metal or composite material such as composite material formed by fibres of carbon or glass embedded in a matrix of hardened resin.

FIG. 3 illustrates a schematic view in perspective of a cell for acoustic treatment 18 of the core 12 of the panel for acoustic treatment 10 of FIG. 2.

The cell for acoustic treatment 18 which comprises the resonating cavity 180 delimited by the enclosure 182, here cylindrical with a circular base, also comprising a protective grille 188, a resonating patch 20 inserted inside the resonating cavity 180.

The protective grille 188 comprises a perforated or microperforated structure or a protective wiremesh to reduce direct impact of the flow. This protective grille 188 is mounted on the end of the enclosure 182 intended to be opposite a fluidic flow, that is, at the end of the enclosure 182 forming part of the first face 121 of the core 12 in contact with the entry layer 14 of the panel for acoustic treatment 10.

The resonating patch 20 for acoustic treatment comprises a resonant plate 21 with a high Young's module, a transducer 22 and an electrical circuit 23 electrically connected to the transducer 22.

As is illustrated more clearly in FIG. 4 which shows the resonant plate 21 according to a first embodiment, the resonant plate 21 comprises a peripheral strip 210 extending along the perimeter of the plate, as well as rectilinear cutouts 211 together defining deformable lamellae 212.

In the first embodiment illustrated in FIG. 4, the deformable lamellae 212 comprise a first end 2120 and a second end 2125, both attached to the peripheral strip 210.

In the first embodiment, with a general circular form, the resonant plate 21 comprises rectilinear cutouts 211 parallel to each other and separated by the same space with the adjacent cutouts to have lamellae 212 all having the same width to easily allow lamellae of different lengths and also have a frequency range for acoustic treatment greater than with lamellae all of the same length, as would be the case for a resonant plate having a general rectangular form with lamellae all of the same width.

FIG. 7 illustrates a resonant plate 21 according to a second embodiment. The second embodiment illustrated in FIG. 7 differs from the first embodiment illustrated in FIG. 4 in that only the first end 2120 of the deformable lamellae 212 is connected to the peripheral strip 210, the second end 2125 being free.

The behaviour of the resonant plate 21 in the face of an aerodynamic flow varies according to the angle of incidence of the flow and the direction.

In the example illustrated in FIG. 1, in which the panels for acoustic treatment 10 comprising the cells for acoustic treatment 18 are mounted on the walls of a turbomachine 1, the fluidic flow F flows mainly according to the axial direction $D_A$ of the turbomachine 1.

The orientation of the resonant plate 21 inside a cell for acoustic treatment 18 is defined by an angle formed between the direction of the lamellae 212 and the direction of the fluidic flow F, in other words between the direction of the lamellae 212 and the axial direction $D_A$ of the turbomachine 1.

The resonant plate 21 according to the first embodiment illustrated in FIG. 4 can function operationally with an orientation defined by an angle between −30° and 30° relative to the axial direction $D_A$ as shown in FIGS. 5 and 6 which show respectively a resonant plate 21 according to the first embodiment with an orientation at 0° and an orientation at −30° relative to the direction of a fluidic flow F, that is, relative to the axial direction $D_A$ of the turbomachine 1.

The resonant plate 21 according to the second embodiment illustrated in FIG. 7 can function operationally with an orientation defined by an angle between −45° and 45° relative to the axial direction $D_A$, as shown in FIGS. 8 and 9 which show respectively a resonant plate 21 according to the second embodiment with an orientation at 0° and an orientation at −45° relative to the direction of the fluidic flow F, that is, relative to the axial direction $D_A$ of the turbomachine 1.

The first embodiment can function in both flow directions (reversible), as opposed to the second embodiment which functions better in the direction presented in FIGS. 8 and 9, that is, with the flow arriving from the first end 2120, the one connected to the peripheral strip 210.

According to the embodiments, the transducer 21 can have different forms.

According to a first example, the transducer 21 can be an electrodynamic transducer comprising a thin layer 220 of electrically conductive material on the lamellae 212 and a magnet 225, such as for example an annular magnet, on which is arranged the resonant plate 21, as is illustrated in FIG. 10. The layer 220 of conductive material can be made via deposit of copper at sites having maximum articulation to form a copper coil.

According to a second example, the transducer 21 can be a piezoelectric transducer comprising a thin layer 220 on the zones of maximal constraints of the lamellae 212, such as at the ends of the lamellae attached to the peripheral strip for maximising the effect according to phases, that is, at the first end 2120 and optionally at the second end 2125 for the second embodiment illustrated in FIGS. 7 to 9.

FIGS. 11 to 13 schematically illustrate a third, a fourth and a fifth embodiments of the resonant plate 21.

The third embodiment illustrated in FIG. 8 differs from the first embodiment illustrated in FIG. 7 in that the general form of the resonant plate 21 is a hexagon.

This hexagonal form easily adapts to cells for hexagonal acoustic treatments 18 such as those presented in FIG. 2, for example.

The fourth embodiment illustrated in FIG. 9 differs from the first embodiment illustrated in FIG. 7 in that the general form of the resonant plate 21 is any form whatsoever, and the fifth embodiment illustrated in FIG. 10 differs from the fourth embodiment illustrated in FIG. 9 in that the cutouts 21 are not parallel, which produces lamellae of non-constant width having a second action lever on the frequencies of resonance of the lamellae and therefore of the possible range of attenuation frequency.

In all the embodiments illustrated, the resonant plate 21 can have a form entered in a circle C whereof the diameter is between 5 and 50 mm, and the lamellae 212 can have a length of between 1 and 50 mm, a width of between 0.5 and 20 mm, and a thickness between 20 µm and 2 mm.

The cutouts 211 between the lamellae 212 can be formed by slots having a width of between 10 µm and 1 mm.

The panel for acoustic treatment 10 therefore comprises a plurality of cells for acoustic treatments 18 fitted with resonating patches 20 which can all be attuned to the same frequency to have a very fine performance acoustically but narrower bandwidth, or else tuned to different frequencies so as to have less efficiency on frequencies but over a much wider frequency band.

The panel for acoustic treatment according to the invention accordingly provides a solution for optimised acoustic treatment for attenuations at low frequencies and whereof the attenuation range is greater in reduced bulk so it can be integrated into propulsive architectures with high dilution rate.

The invention claimed is:

1. A resonating patch for acoustic treatment for a cell for acoustic treatment of an acoustic panel of a turbomachine of an aircraft, the resonating patch comprising a resonant plate, a transducer and an electrical circuit electrically connected to the transducer, the resonant plate comprising a peripheral strip extending along the perimeter of the resonant plate,
wherein the resonant plate comprises cutouts together defining deformable lamellae having at least one end connected to the peripheral strip.

2. The resonating patch for acoustic treatment according to claim 1, wherein the cutouts of the resonant plate are rectilinear cutouts together defining polygonal lamellae.

3. The resonating patch for acoustic treatment according to claim 1, comprising at least two lamellae of different dimensions.

4. The resonating patch for acoustic treatment according to claim 1, wherein the resonant plate has a form entered in a circle of diameter D between 5 and 50 mm, and the lamellae have a length of between 1 and 50 mm.

5. The resonating patch for acoustic treatment according to claim 1, wherein the lamellae comprise a width of between 0.5 and 20 mm.

6. The resonating patch for acoustic treatment according to claim 1, wherein the lamellae have a thickness between 20 μm and 2 mm.

7. The resonating patch for acoustic treatment according to claim 1, wherein the cutouts have a width of between 10 μm and 1 mm.

8. The resonating patch for acoustic treatment according to claim 1, wherein the cutouts are parallel to each other.

9. The resonating patch for acoustic treatment according to claim 1, wherein two adjacent cutouts are devoid of parallelism.

10. The resonating patch for acoustic treatment according to claim 1, wherein the lamellae comprise two ends according to the direction of the length, the two ends being attached to the peripheral strip.

11. The resonating patch for acoustic treatment according to claim 1, wherein the plate comprises material with a high Young's module.

12. The resonating patch for acoustic treatment according to claim 1, wherein the transducer is a piezoelectric transducer comprising a thin layer on the zones of maximal deformations of lamellae, such as at the ends of the lamellae attached to the peripheral strip.

13. The resonating patch for acoustic treatment according to claim 1, wherein the transducer is an electrodynamic transducer comprising a thin layer of an electrically conductive material on the lamellae and a magnet.

14. A cell for acoustic treatment comprising an enclosure, a cavity delimited by the enclosure, and a resonating patch according to claim 1 arranged in the cavity.

15. The cell for acoustic treatment according to claim 14, also comprising a protective grille mounted on an end of the enclosure intended to be opposite a fluidic flow.

16. A panel for acoustic treatment intended to be arranged on at least one wall of a turbojet in contact with a fluidic flow, the panel comprising a first plate, a second plate parallel to the first plate and having a first face intended to be in contact with a fluidic flow and a second face opposite the first plate,
wherein it also comprises cells for acoustic treatment according to claim 14 extending between the first and second plates.

17. A turbomachine for an aircraft comprising at least one panel for acoustic treatment according to claim 16.

* * * * *